US007326871B2

(12) United States Patent
Kenny et al.

(10) Patent No.: US 7,326,871 B2
(45) Date of Patent: Feb. 5, 2008

(54) SORTING SYSTEM USING NARROW-BAND ELECTROMAGNETIC RADIATION

(75) Inventors: Garry R. Kenny, Nashville, TN (US); Arthur G. Doak, Nashville, TN (US)

(73) Assignee: MSS, Inc., Nashville, TN (US)

(*) Notice: Subject to any disclaimer, the term of this patent is extended or adjusted under 35 U.S.C. 154(b) by 0 days.

(21) Appl. No.: 10/921,000

(22) Filed: Aug. 18, 2004

(65) Prior Publication Data

US 2006/0081510 A1 Apr. 20, 2006

(51) Int. Cl.
*B07C 5/00* (2006.01)
*B07C 5/342* (2006.01)
*G01J 3/30* (2006.01)

(52) U.S. Cl. ...................... 209/579; 209/576; 209/580; 356/317

(58) Field of Classification Search ................ 209/576, 209/579, 580; 250/461.1
See application file for complete search history.

(56) References Cited

U.S. PATENT DOCUMENTS 4,131,540 A 12/1978 Husome et al. ............. 209/582
4,657,144 A 4/1987 Martin et al. ............... 209/546
4,919,534 A 4/1990 Reed ........................... 356/73
5,085,325 A 2/1992 Jones et al. ................. 209/580
5,220,172 A * 6/1993 Berthold et al. ......... 250/461.1
5,297,667 A 3/1994 Hoffman et al. ............ 198/493
5,314,072 A * 5/1994 Frankel et al. ............. 209/44.1
5,318,172 A 6/1994 Kenny et al. ............... 209/524
5,333,739 A 8/1994 Stelte ......................... 209/582
5,443,164 A 8/1995 Walsh et al. ................ 209/580
5,675,416 A 10/1997 Campbell et al. ........... 356/367
5,848,706 A 12/1998 Harris ........................ 209/580
5,966,217 A 10/1999 Roe et al. ................... 356/402
6,250,472 B1 6/2001 Grubbs et al. ............. 209/44.2
6,335,501 B1 * 1/2002 Khalfan ...................... 209/582
6,369,882 B1 * 4/2002 Bruner et al. ................. 356/73
6,380,503 B1 * 4/2002 Mills et al. ................. 209/586
6,778,276 B2 * 8/2004 Bruner et al. ............... 356/417
6,832,783 B2 * 12/2004 Lawandy ..................... 283/85
6,914,678 B1 * 7/2005 Ulrichsen et al. ........... 356/429
7,019,822 B1 * 3/2006 Doak et al. ................... 356/73
2003/0132142 A1 * 7/2003 Kumar ....................... 209/579

* cited by examiner

*Primary Examiner*—Patrick Mackey
*Assistant Examiner*—Terrell Matthews
(74) *Attorney, Agent, or Firm*—Waddey & Patterson, P.C.; Lucian Wayne Beavers

(57) ABSTRACT

A system for sorting articles includes a detector system having a plurality of narrow bandwidth sources of electromagnetic energy sequentially illuminating articles passing through the detector system, the detector system further including a collector for collecting electromagnetic energy reflected from the articles; a deflector for deflecting selected articles toward an alternative destination; and a control system, operably connected to the collector and the deflector, for actuating the deflector in response to a sensed parameter of the electromagnetic energy collected in the collector.

20 Claims, 6 Drawing Sheets

SORTING SYSTEM USING NARROW-BAND ELECTROMAGNETIC RADIATION

Be it known that we, Garry R. Kenny and Arthur G. Doak, both citizens of the United States residing in Nashville, Tenn., have invented a new and useful "Sorting System Using Narrow-Band Electromagnetic Radiation."

BACKGROUND OF THE INVENTION

1. Field of the Invention

The present invention relates generally to systems for separating selected articles from a stream of articles, and more particularly, but not by way of limitation, to a system particularly suited for sorting recyclable materials such as different types of plastic containers and paper or cardboard products, including carrier board, from each other.

2. Description of the Prior Art

Environmental campaigns and recycling efforts in many areas have generated a substantial supply of recyclable waste paper and like materials. These materials need to be sorted before they can be recycled. For instance, plastic and glass articles need to be sorted from the stream itself and then further by plastic resin type, color, etc. Colored paper stock often needs to be separated from white stock, and cardboard and carrier board needs to be removed from newsprint. In addition, it is sometimes necessary or desirable to separate printed materials from blank materials. Further, separation processes such as screens designed to remove cardboard and plastic and metal containers from paper streams, often miss some of those materials, requiring additional separation steps. Unfortunately, sorting of waste paper and paperboard, etc. is still currently performed almost entirely by manual sorting. Manual sorting of such materials can be time consuming and expensive, which can render the use of recycled paper less economical than virgin paper material. This is even more apparent when so-called carrier board is present in the waste stream. So-called carrier board, commonly understood to be as the paperstock used in, e.g., cereal boxes, soda or beer can carriers, frozen food boxes, etc., must be sorted manually, as there is currently no effective automated method for doing do.

Numerous automated waste separation techniques are known. However, these techniques are generally designed for the recovery of metals, alloys, municipal waste, mixed recyclables and plastics. Paper (or, more generally, sheeted material) sorting presents unique problems that cannot be overcome by most prior art separation techniques. For instance, the relatively lightweight and flexible nature of paper presents unique problems when sorting is attempted. Indeed, these problems make it difficult to supply paper to a sorting sensor, especially not at a desirable feed rate (usually defined in terms of feet per minute (fpm), but sometimes also in terms of pieces or objects per minute (ppm) or tons per hour (tph)). Without higher speeds, automated sorting systems do not achieve efficiencies substantially greater than manual sorting. The problem is exacerbated where the waste stream includes paper and non-paper waste.

A number of different sorting systems have been proposed in the prior art for sorting various articles based upon the color of the articles or the characteristics of the reflected or transmitted electromagnetic radiation to which the article is exposed. Such systems have been utilized for sorting glass, plastic, paper, newsprint, fruit and other edible items, and the like. Similarly, a number of arrangements have been provided for carrying the articles through an inspection zone, and for exposing the articles to electromagnetic radiation and then collecting and analyzing the reflected and/or transmitted radiation.

For example, U.S. Pat. No. 4,131,540 to Husome et al. discloses a color sorting system wherein light is reflected off tomatoes and the reflected light is collected and analyzed as the tomatoes fly through an inspection zone.

U.S. Pat. No. 4,657,144 to Martin et al. discloses a system for removing foreign material from a stream of particulate matter such as tobacco as it cascades through an inspection zone.

U.S. Pat. No. 4,919,534 to Reed, discloses a system for determining the color of glass bottles, wherein the light energy is transmitted through the glass bottles.

U.S. Pat. No. 5,085,325 to Jones et al. discloses a system of a very common type wherein articles are examined as they are supported upon a moving conveyor belt.

U.S. Pat. No. 5,297,667 to Hoffman et al. discloses a system of utilizing two light sources and a camera to analyze articles as they fly through an inspection zone.

U.S. Pat. No. 5,314,072 to Frankel et al. discloses a system which analyzes the transmissive characteristics of articles which are exposed to x-ray fluorescence.

U.S. Pat. No. 5,318,172 to Kenny et al. discloses a system which distinguishes different types of plastic materials based upon their reflected electromagnetic radiation.

U.S. Pat. No. 5,333,739 to Stelte discloses another system which transmits light through articles, namely glass articles, and analyzes the transmitted light to determine color.

U.S. Pat. No. 5,443,164 to Walsh et al. discloses a plastic container sorting system which utilizes both transmitted electromagnetic energy and reflected electromagnetic energy to analyze and identify articles.

U.S. Pat. No. 5,675,416 to Campbell et al. discloses an apparatus which looks at the transmissive properties of articles to separate them based upon the material of the article.

U.S. Pat. No. 5,848,706 to Harris discloses a sorting apparatus which examines optical characteristics of the articles against a viewing background.

U.S. Pat. No. 5,966,217 to Roe et al. discloses a system for analyzing articles wherein reflected radiation is split into a plurality of streams which are then filtered and analyzed.

It has also been suggested to separate carrier board from a newspaper stream via a color-based identification system. However, this approach is not very effective or accurate since color is a secondary feature of these materials, not a fundamental characteristic.

In a relatively recent and unique approach, Doak et al., in U.S. Pat. No. 6,497,324, disclose a sorting system utilizing a multiplexer to allow a single analyzer unit to be used to analyze electromagnetic signals from each of a plurality of collector units. Although effective, the Doak et al. system requires the operation of complex and highly sensitive software and mechanical components, which can be difficult to maintain.

In addition, as noted above, another problem encountered by waste sorting systems is the identification and separation of carrier board and coated or waxed board material commonly used as, e.g., beverage cartons, cigarette cartons, etc. from other paper materials. More particularly, the separation of white or printed paper stock from an article stream can be accomplished by recently developed systems, leaving newsprint and carrier board in the article stream. Further separation to provide only newsprint in the stream, however, has proven problematic.

Thus, it is seen that although there have been many arrangements proposed for the examination of a stream of articles by analysis of reflected and/or transmitted electromagnetic radiation from the articles, there is a continuing need for improved systems, which may simplify the analytical mechanism and permit the identification of materials (such as carrier board) heretofore found difficult to process.

SUMMARY OF THE INVENTION

A system for sorting articles includes a feed conveyor for conveying the articles toward a first destination. A plurality of sources of narrow bandwidth electromagnetic radiation of differing frequencies are provided for shining electromagnetic energy on the articles in seriatim. The sources are preferably arrayed and actuated such that the individual beams of electromagnetic energy from the sources illuminate the same region of the article as it passes through the sensor region. This can be accomplished spatially or through timing, or both. Each of the sources advantageously has a beam spreader associated with it, for spreading the radiation beam across the width of the conveyor (though preferably not along the length of the conveyor, to avoid overlap with adjoining beams). Additionally, the individual sources may be made up of several sources (arranged perpendicular to the flow direction of the articles) with or without beam spreaders such that wide feed streams can be accommodated. A collector is provided for collecting energy reflected from the articles. A deflector is provided for deflecting selected articles toward an alternative destination. A control system is operably connected to the collector and the deflector for actuating the deflector in response to a sensed parameter (such as color) of the energy collected in the collector.

By providing a series of sources of electromagnetic radiation of narrow bandwidth (i.e., a bandwidth range of from about 5 nm to about 250 nm), the identification and separation of several classes of articles can be accomplished. It is well known that the amount of reflected radiation at specific frequencies varies for differing materials. In the visible range this variation determines the color of an object. In the near infrared range (i.e. from about 680 nm to 2000 nm) the amount of reflected radiation is determined by the molecular structure of the material, and therefore its composition.

Conventional separation systems for recyclable materials typically illuminate the articles with a steady state broadband radiation from a light source such as a halogen lamp. The reflected light is then measured at various frequencies utilizing a spectrometer type system (diffraction grating, etc.) or a system of detectors with individual frequency filter sets. This approach is costly due to the number of expensive optical and detector components required. An improved approach utilizing a multiplexer minimizes the number of detectors and filters required but introduces a mechanical system which limits reliability and throughput speed.

The improved system utilizes a series of narrow bandwidth sources which can be switched on and off very rapidly such that the amount of reflected radiation can be measured at a number of specific frequencies without the necessity of a broadband light source or a multiplexer. Further the shape of the narrow bandwidth source can be selected or shaped to optimize the resulting reflection intensity differences between differing materials and therefore the identification accuracy.

For instance, assuming several individual light sources, aligned in the direction of travel of the articles on the conveyor, each actuated sequentially, as an article travels along the conveyor, a pulse of radiation from each of the sources strikes each article sequentially and in substantially the same place. The reflected radiation is collected by multiple collectors. By analyzing the amount of radiation reflected by an article from each differing radiation frequency the article can be identified as for example, polyethylene terephthalate (PET) plastic, newspaper, brown carrier board, white paper, etc.

Referring to FIG. 9, it can be seen that differing materials reflect differing amounts of electromagnetic radiation at different frequencies (PET is illustrated as a dotted line, high density polyethylene (HDPE) is illustrated as a solid line and paper is illustrated as a dashed line). Identification of the differing materials can be made by selecting illuminating frequencies that correspond to a wavelength region with decreases (or "dips" in the spectrum) in the amount of reflected radiation along with illuminating frequencies at an adjacent region. The ratio of the reflected radiation from these two (or three) frequencies will be different than for another material that does not have a decrease in reflection at one of the frequencies.

For example in FIG. 9, taking the ratio of reflected radiation at 1220 nm versus 1300 nm will give approximately equal intensity (a ratio value of about 1) for both frequencies with paper and PET plastic. For HDPE plastic, however, the ratio of the reflected intensity of 1220 nm versus 1300 nm would be on the order of about 2/7 or about 0.29. If in addition one also measured the ratio of the reflected radiation from 1220 nm and 1660 nm, then paper would again be about 1, while PET plastic would be about 5/2 or about 2.5, with HDPE being about 2/6.3 or about 0.32.

Other methods beside ratiometric calculation can also be used to determine the type of material utilizing the amount of radiation reflected at differing frequencies. These methods include the use of neural net engines, spectrum comparison with predetermined spectrum stored in a look-up table, spectrum stored by training the system with feed materials, or other similar methods.

The number of different frequencies required depends upon the number of different type of materials in the feed stream and the accuracy of identification required. In a typical feedstream of recyclable materials, it is likely that employing eight different frequencies would provide acceptable accuracy. More frequencies may be utilized to obtain increased accuracy.

It can be seen in FIG. 9 that the width of the decreased reflection "dips" varies with material and with wavelength. Current available narrow band radiation sources in general fall into two categories, light emitting diodes (LEDs) and laser diodes. The typical bandwidth of LEDs is shown in FIG. 10, and is on the order of 100 nm when measured from the 20% power level. Laser diodes on the other hand have typical bandwidths of less than 5 nm. LEDs are in general less expensive than laser diodes so their use is preferable when possible.

Laser diodes may be required when the reflection "dip" is very narrow, such as the relatively narrow 940 nm dip for HDPE and the 1660 dip for PET plastic. Contrariwise, the LED radiation bandwidth matches very well with the wider reflection dips of HDPE between 1150 nm and 1250 nm and between 1375 nm and 1475. To obtain the greatest difference in the ratios of the reflected radiation intensity at different frequencies it is desirable to "match" the illuminated spectrum with the spectrum of the reflected radiation "dip".

The power level of available LEDs and laser diodes is limited so matching the illuminator spectrum with the reflected radiation spectrum is advantageous to maximize the signal to noise ratio of the sensor system. Further, laser diodes with acceptable power output are available in fewer frequencies than that of LEDs. Therefore, it may be necessary to modify the output spectrum of an LED at a specific frequency. This can be accomplished, for instance, by placing the appropriate filter between the LED source and the feedstream articles. For example, the PET plastic dip at 1660 is more narrow than a typical LED output spectrum, but wider than that of a typical laser diode. Hence, a filter that limits the LED 20% bandwidth to about 1640 nm to 1690 nm, or 50 nm bandwidth, will result in a better spectrum match than either a laser diode or an LED without a filter.

In practice the identification process would include:

1) Sequentially illuminating the same region of the feedstream articles with each of the different frequency sources as the article passes the region of the sensor.
2) Measuring and storing the reflected radiation levels from each of the sources at a number of positions across the width of the feedstream. The articles are measured in at least 5 places across the feedstream, and are measured often enough that for a given feedstream speed (of say 500 to 1,000 feet per minute), the article is measured in at least five places along the length of the article, or at least such that on average each article is measured in at least 20 to 30 places.
3) Taking ratios of, or comparing the spectrum to, the measured reflected radiation levels at the various frequencies to determine the type of material for each measured area of the article.
4) Determining which type of material the article is substantially composed of by examining the measurements for a majority type of material, or type of material in selected regions of the article, or type of material with the highest contiguous counts.

In another embodiment of the invention, the system is capable of detecting the presence of carrier board (which does not contain lignin) in an article stream having newsprint (which contains lignin) and carrier board by determining the presence of lignin in articles in the stream by measuring the fluorescence of the articles when exposed to electromagnetic radiation at a frequency of about 532 nanometers (nm) ("green" light) and measuring the fluorescence at a frequency between about 600 and 700 nm; articles in which lignin is not detected are deflected to thereby separate carrier board from lignin-containing articles.

The present invention further includes methods of using the sorting system and its various components.

It is therefore a general object of the present invention to provide improved apparatus and methods for sorting objects by material and/or color, and particularly for sorting lignin-containing articles from those not containing lignin.

Still another object of the present invention is the provision of a system for sorting objects wherein the objects are analyzed as they travel along a conveyor.

Yet another object of the present invention is the provision of a system for detecting multiple classes of articles flowing along a conveyor without the need for a multi-plexer or other complex mechanical systems.

Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
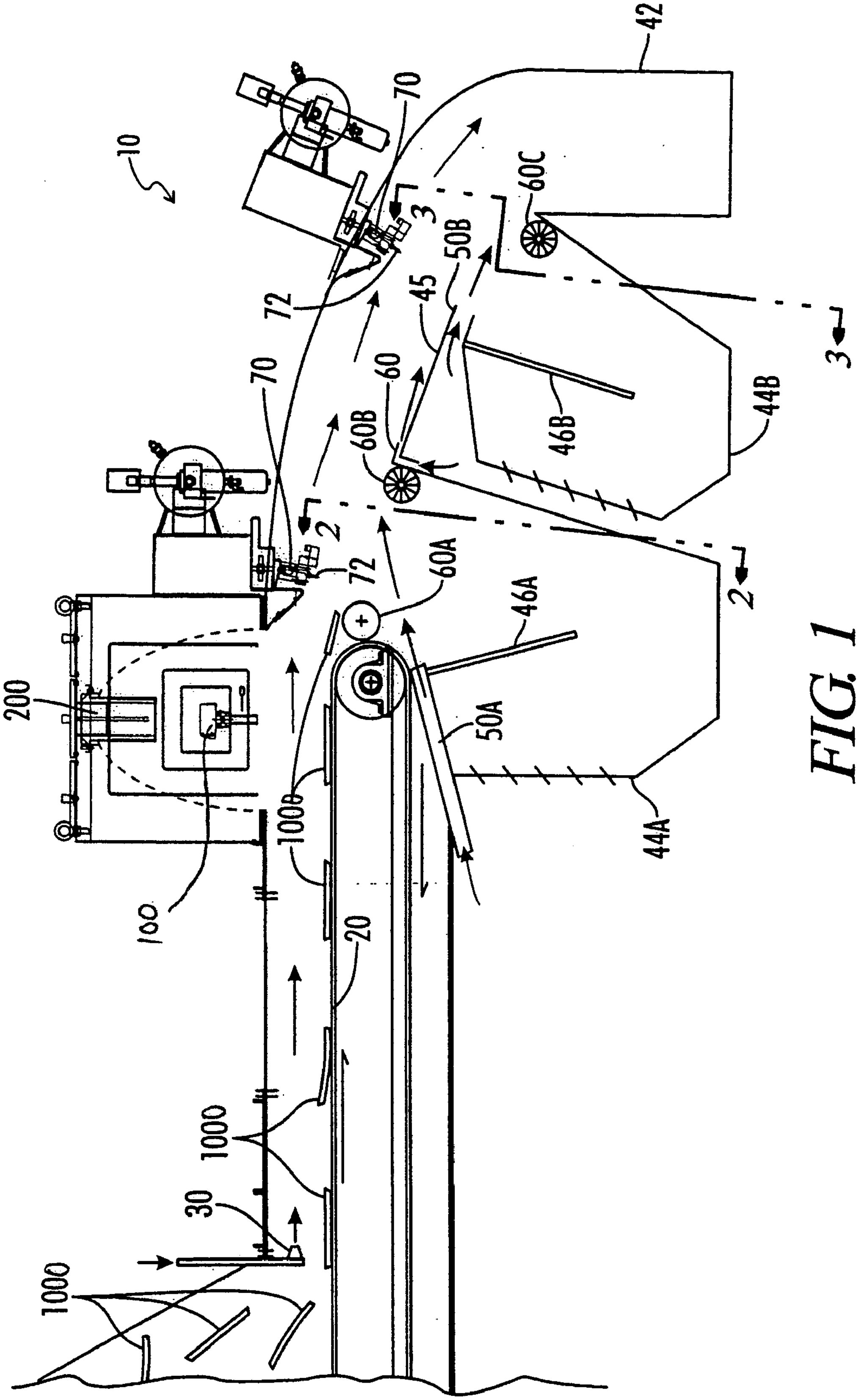
FIG. 1 is a side cross-sectional view of one embodiment of the sorting system of the present invention.

In a preferred embodiment, illustrated in FIG. 1, the present invention relates to a sorting system 10 for sorting material 1000, such as waste paper. Sorting system 10 comprises a path of travel of material 1000, defined by the travel of a conveyor 20. Material 1000 can comprise any waste material for which sorting is desired, such as plastics, glass, etc., but preferably includes paper stock, including newsprint, carrier board and the like. Conveyor 20 can comprise any conveyor used for moving material 1000 or the like, such as a roller or conveyor belt and be formed of fabric, mesh, rubber, etc. as would be familiar to the artisan. Advantageously, conveyor 20 is made of a material which provides sufficient friction to maintain material 1000 traveling the path of travel, to the extent possible. Conveyor 20 is typically driven at the desired rate of travel of material 1000 along the path of travel, as discussed in more detail hereinbelow.

Figure 2:
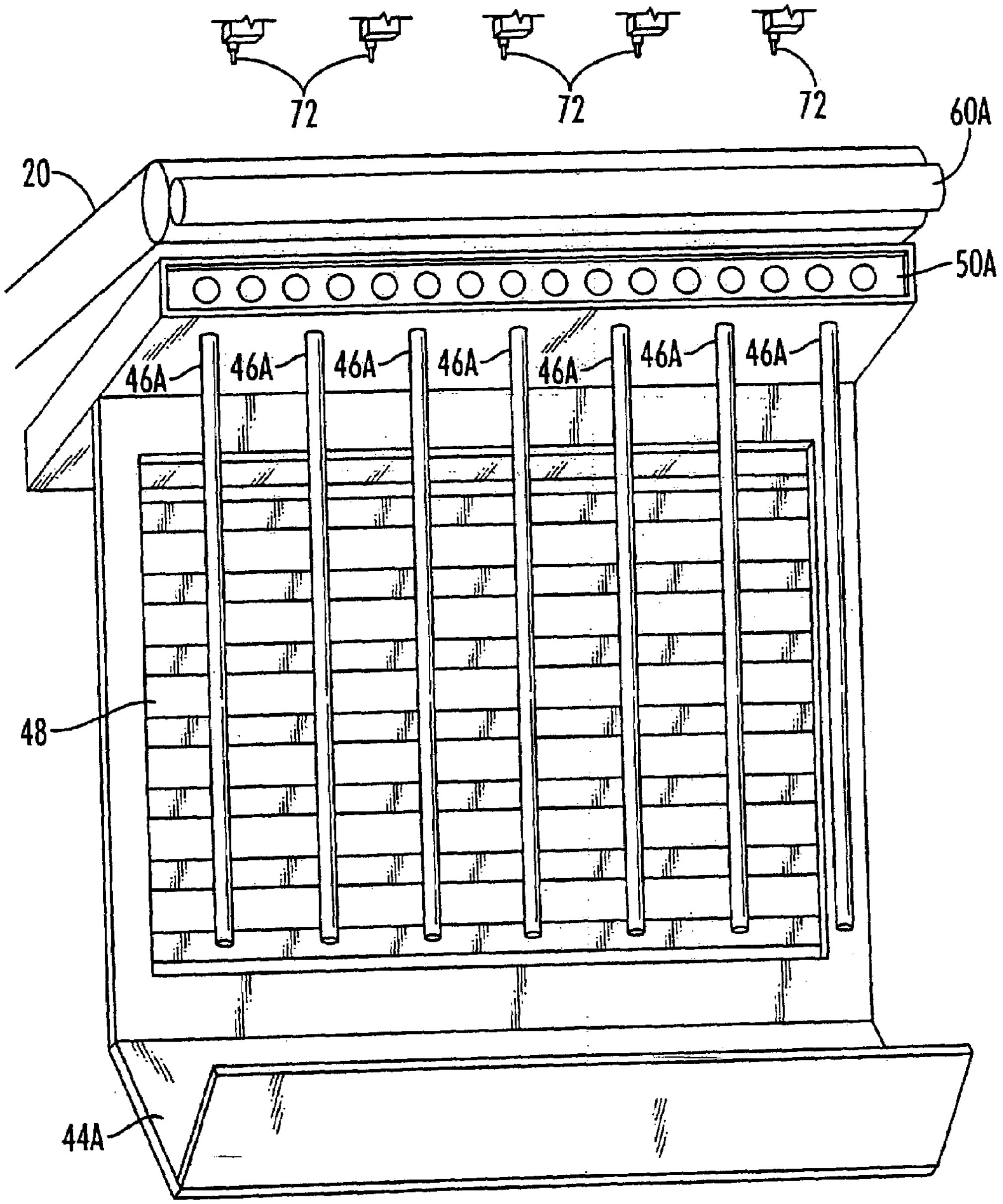
FIG. 2 is a transverse cross-sectional view of the sorting system of FIG. 1, facing against the direction of travel of sheeted material, and taken along lines 2-2.

Still referring to FIG. 2, sorting system 10 can also comprise a source of entrainment gas 30 which produces a flow of gas, especially air, used to entrain material 1000 traveling along conveyor 20, and indicated by arrows. Entrainment air provided by source 30 can maintain material 1000 flowing in the proper path along conveyor 20, even at feed rates as high as 800 fpm, or higher. Indeed, feed rates as high as 1000 fpm and higher can be utilized in sorting system 10 of the present invention.

In addition to the use of entrainment air, it is also contemplated that other systems can be employed to maintain the sheeted material spread consistently on conveyor 20 and flowing in the proper direction. Exemplary of such a system is that disclosed by Grubbs, Kenny and Gaddis in U.S. Pat. No. 6,250,472, the disclosure of which is incorporated herein by reference.

Sorting system 10 can further comprise a plurality of receiving bins 40 into which material 1000 traveling along conveyor 20 can be sorted. Receiving bins 40 comprise a "default" receiving bin 42 into which material 1000 will flow if not directed into any of the preceding receiving bins, as well as at least one "selection" bin 44, and in the embodiment shown in FIG. 1, two selection bins 44A and 44B, into which selected individual ones of material 1000 can be directed, depending on particular characteristics of the selected material 1000.

Selection bins 44A and 44B can also have associated therewith a source of directional gas 50A and 50B. Directional gas sources 50A and 50B comprise conduits for gas (e.g. air) flow in a direction across the top opening of each of selection bins 44A and 44B (and indicated by arrows) to ensure that sheeted material 1000 flowing along with the entrainment gas does not inadvertently enter receiving bins 44A and 44B. In other words, because the openings of receiving bins 40 would ordinarily cause eddying and other current variations of entrainment gas, it is possible that, without the use of directional gas flow, individual ones of material 1000 may enter one of selection bins 44A and 44B when not intended. Directional gas sources 50A and 50B provide a directional gas flow to maintain the flow of material 1000 along the flow of entrainment gas. Typically, directional gas sources 50A and 50B are powered by fans or blowers (not shown).

As illustrated in FIG. 1, directional gas sources 50A and 50B can be arrayed so as to make use of the structures defining the walls of selection bins 44A and 44B. For instance, directional gas source 50A, used for selection bin 44A, can comprise a conduit running between selection bin 44A and conveyor 20. Likewise, directional gas source 50B, used for selection bin 44B, can comprise a conduit extending through the structure forming the wall separating selection bin 44A and selection bin 44B.

Figure 3:
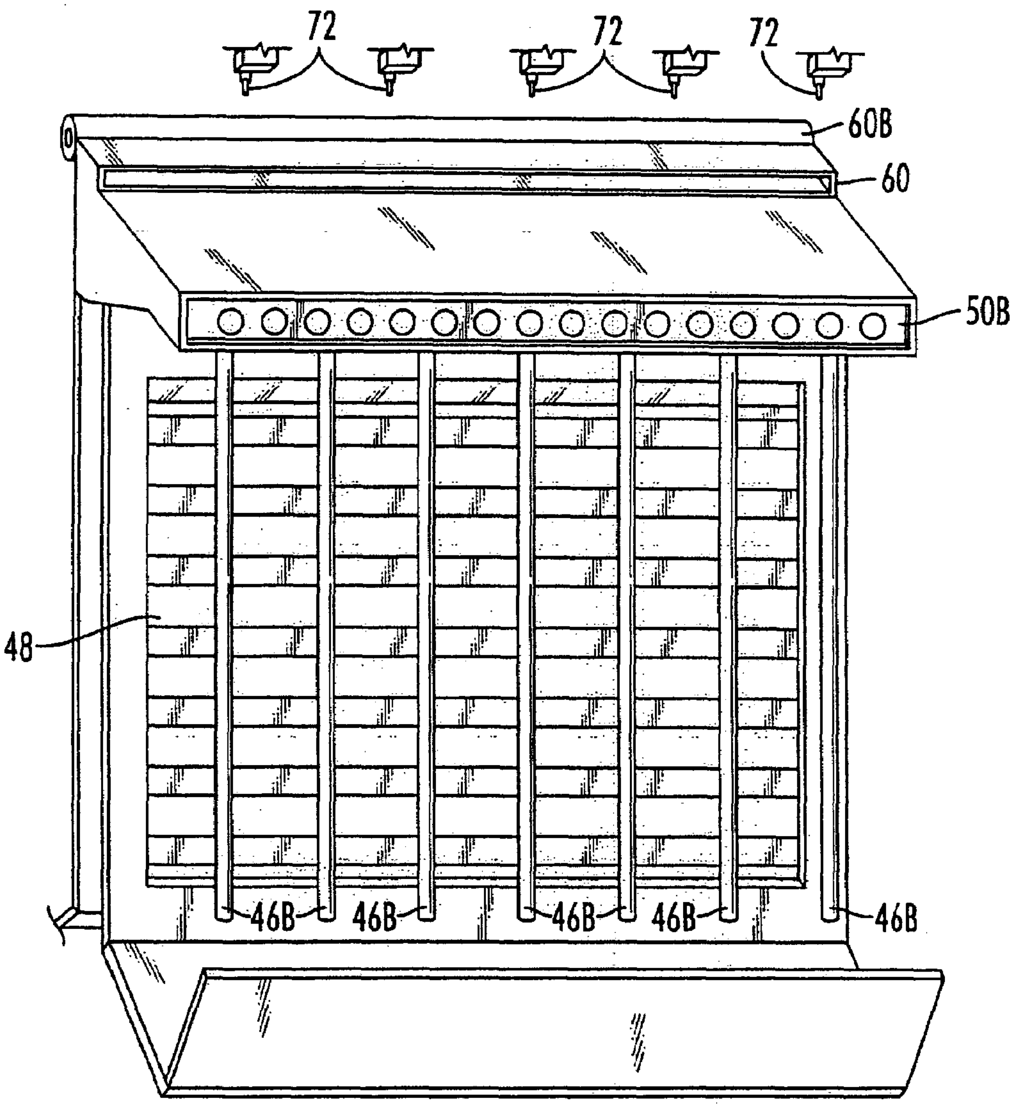
FIG. 3 is a transverse cross-sectional view of the sorting system of FIG. 1, facing against the direction of travel of sheeted material, and taken along lines 3-3.
Figure 4:
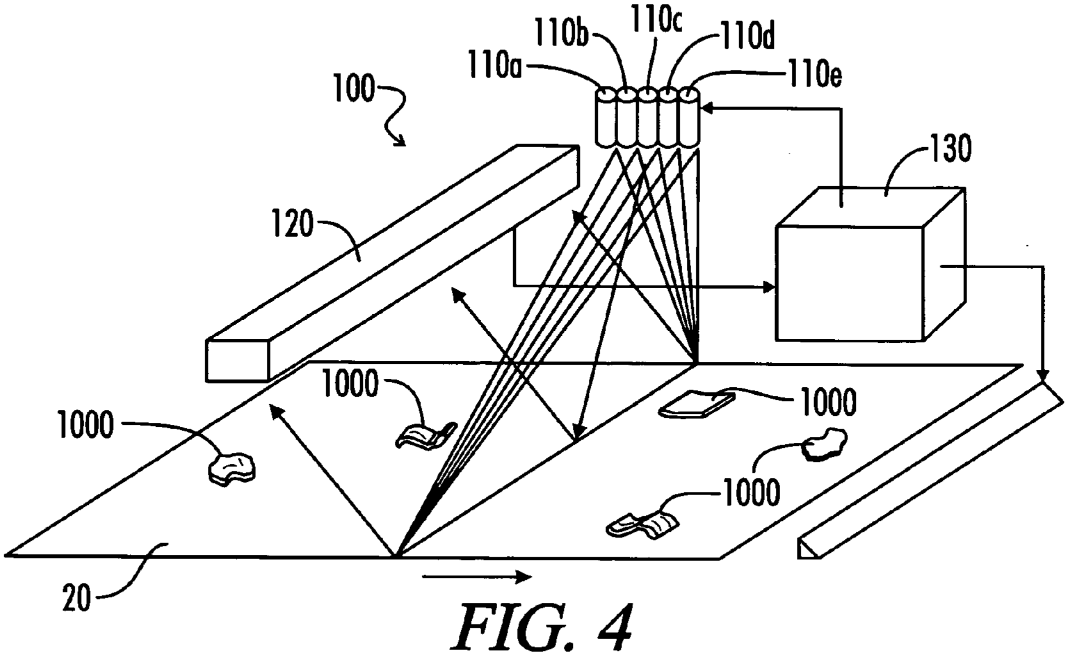
FIG. 4 is a perspective schematic view of the detector system of the present invention.

In addition, the possibility exists on any surface after the termination of conveyor 20 that the flow of material 1000 may be interrupted due to friction. In order to reduce this possibility, in another preferred embodiment, a fluidizing flow of gas can also be created along such surface such as by providing a source of fluidizing gas 60 which creates a fluidizing flow of gas along the surface (indicated by arrows) to keep material 1000 from being hung up. For instance, the gas flow from directional gas source 50B can be partially diverted to be outletted at a proximate end of the surface 45 between the openings of selection bin 44A and 44B, as illustrated in FIGS. 1 and 3. This diverted gas flow forms a fluidizing layer of gas along the surface, thus helping to prevent material 1000 from being caught on surface 45. Moreover, rollers, such as 60A, 60B, and 60C can be positioned to facilitate the flow of material 1000 along the flow path of the entrainment gas, and otherwise to help prevent material 1000 from being caught on corners or other elements of sorting system 10. Rollers 60A, 60B, and 60C can be driven or passive, but are preferably passive rollers.

Each of selection bins 44A and 44B also has a deflector or sorter 70 associated therewith to direct selected individual ones of material 1000 into the respective selection bin 44A or 44B. Sorter 70 preferably comprises an air jet or other like device which, when actuated, will cause the selected material 1000 to pass through any directional gas flow across the opening of the specific selection bin 44A or 44B and thereinto.

More preferably, sorter 70 can comprise a plurality of air jets 72 extending generally across the width of sorting system 10. In this manner, when individual ones of the material 1000 is arrayed cross the width of conveyor 20 and the path of travel of material 1000, individual ones across the width of the path of travel of material 1000 can be selected to be directed into one of the selection bins 44A or 44B by actuating only those air jets 72 as would direct the selected material 1000 into the respective receiving bin 40.

Upstream from the first selection bin 44A, sorting system 10 comprises a detector system 100 capable of detecting one or more characteristics of material 1000 flowing along conveyor 20. Characteristics detected by detector system 100 can comprise reflectance (indicative of whiteness), color, presence of printing, presence of lignin or other characteristics of material 1000. Signals from detector system 100 are provided to a microprocessor 200 which then can provide a control system to sorters 70 to direct sorters 70 to direct individual ones of material 1000 into selection bins 44A or 44B provided certain measured criteria are met, or, microprocessor 200 can permit material 1000 to flow past selection bins 44A and 44B, by not actuating any of sorters 70, and thus be directed into default bin 42 if selection criteria are not met, or vice versa.

DETECTOR SYSTEM

Detector system 100 comprises a plurality of sources of narrow bandwidth electromagnetic energy or radiation 110, such as lasers 110*a*, 110*b*, 110*c*, 110*d*, 110*e*, etc. As noted above, LEDs can also be employed, and/or LEDs having a filter limiting their bandwidth. The number of sources 110 employed and the center frequency of those sources will depend on material 1000 is to be sorted. For instance, if any type of plastic resin is to be sorted from a paper stream fewer frequencies 110 will be required than if the type of plastic resin also has to be sorted as well. For instance, frequencies of interest for plastics identification are 920 nm, 1210 nm, 1425 nm, 1660, 1725 to 2000 nm and 2125 nm. The primary aseptic packaging frequency of interest is 1455 to 1485 nm.

Sources 110 are positioned above conveyor 20 and sequentially illuminate a section across conveyor 20. In order to avoid overlap between adjoining illuminated sections, sources 110 preferably illuminate conveyor 20 in a relatively narrow line across the width of conveyor 20. The width (i.e., thickness of the beam along the direction of travel of material 1000) of the line across conveyor 20 illuminated by sources 110 will depend on factors such as how far apart sources 110 are disposed and the rate of travel of material 1000 on conveyor 20. In a typical example, the lines illuminated across the width of conveyor 20 by sources 110 should be no more than about 1.5 centimeters (cm) in thickness, most preferably no more than about 1.0 cm in thickness.

Electromagnetic energy from sources 110 illuminates material 1000 and is then reflected into a reflectance collector or detector array 120 to measure the reflected light intensity from material 1000 illuminated by sources 110. Data from the detector array 120 is processed by a control cabinet 130, which then actuates sorters 70. Detector array 120 is comprised of an array of devices which function to collect the light reflected from material 1000 when illuminated by electromagnetic energy from sources 110, such as photodiodes or a lens array. When lignin detection via fluorescence is desired, the relevant detector array 120 would have two associated photodiodes to enable lignin detection via fluorescence.

The use of narrow bandwidth sources 110 is especially important to enable both the lignin and the plastics detection and identification. Color identification could be accomplished with a broadband source, but the lignin identification will require a source with a narrow enough bandwidth in the green range so as not to overlap the red fluorescence. Plastics and other material identification in the near infrared range will also require narrow source bandwidths to identify their characteristic sharp absorption dips and/or reflective peaks.

Lignin content would be detected using illumination of material 1000 with a source 110 comprising a narrow band green laser at 532 nm and then measuring the resulting red fluorescence via a filter and high gain detector. The intensity of the red fluorescence is dependent on the distance between lignin-containing material 1000 and detector array 120.

A potential problem with this approach lies in the fact that not all material 1000 lies flat on conveyor 20. When material 1000 is raised up from the surface of conveyor 20, such as when material 1000 is "crumpled", it is thus closer to detector array 120 and can skew the measurement of red fluorescence, since the reflection from material 1000 would be coming from a location closer to detector array 120 than if material 1000 was lying flat on conveyor 20. A solution to this problem is to factor out the intensity variation by determining lignin content through the ratio of the red fluorescence to the reflected green light, or a ratio with an average of the reflected intensity of the blue, red, and green sources.

An additional problem associated with lignin detection is the difference in the lignin fluorescence intensity due to the color of the object. Fluorescence from red and green colors tend to have a higher intensity than other colored material containing the same percentage of lignin. One possible solution to this problem is to compensate the calculated lignin content depending on the color of the material being analyzed. This can be accomplished by developing a look-up table which could be determined experimentally for the various colors and shades of colors.

There are several possible implementations of the lignin portion of the sensing. They all require two photodiode detectors per detection channel 125, with one diode allowed to receive only the red fluorescence, and potentially longer, wavelengths. In one embodiment, illustrated in FIG. 5, two photodiodes, 140*a* and 140*b*, are placed next to each other either in or near the focal plane of the lens 141. Another embodiment, illustrated in FIG. 6, is to utilize a dichroic mirror 142 to reflect energy having a wavelength of approximately 600 nm to one diode 140*a* with shorter wavelengths passing through to the other diode 140*b*.

Figure 5:
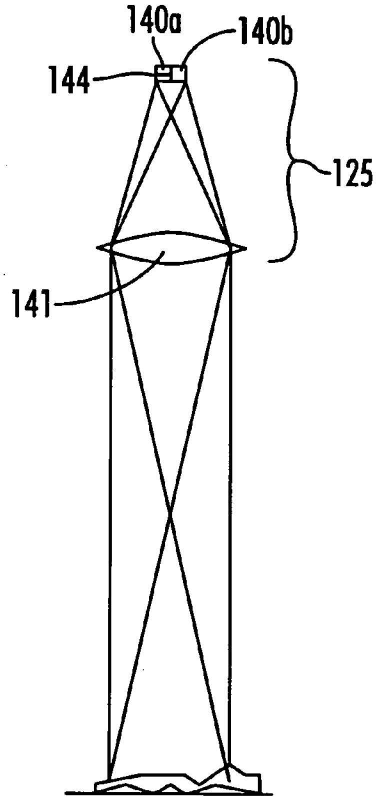
FIG. 5 is a schematic view of one embodiment of the light collector of the system of FIG. 4.

More specifically, the embodiment shown in FIG. 5 has one of photodiodes, 140*a*, covered by a bandpass filter 144 with a center frequency in the range of 650 nm with a bandwidth of 30 to 50 nm. An advantage of this embodiment is simplicity and a disadvantage is a reduction in signal level of 2 or more due to the spread of the image to accommodate the area of the two detectors 140*a* and 140*b*.

Figure 6:
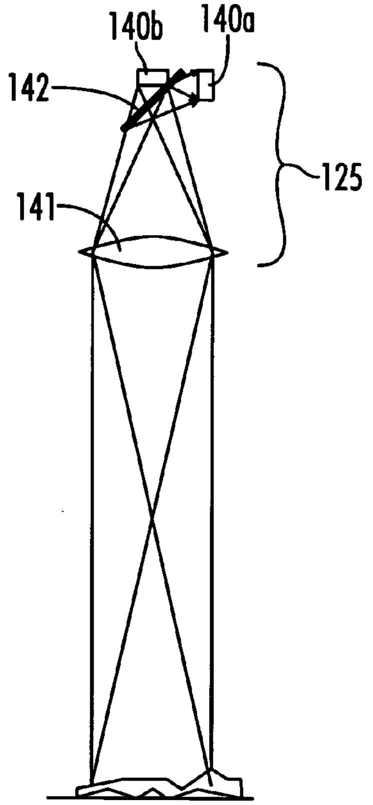
FIG. 6 is a schematic view of another embodiment of the light collector of the system of FIG. 4.

In the embodiment of FIG. 6, the dichroic mirror 142 reflects all wavelength above the green bandwidths to detector 140*a*. Detector 140*b* would measure the blue and the green reflected light. This embodiment would require that the detector 140*b* amplification be variable as the fluorescence signal is on the order of 1000 times less than the reflected green signal so it would likely be about the same for the near infrared (NIR) reflected signals. This embodiment is more complicated than the first one but would likely produce a higher relative signal level.

Figure 7:
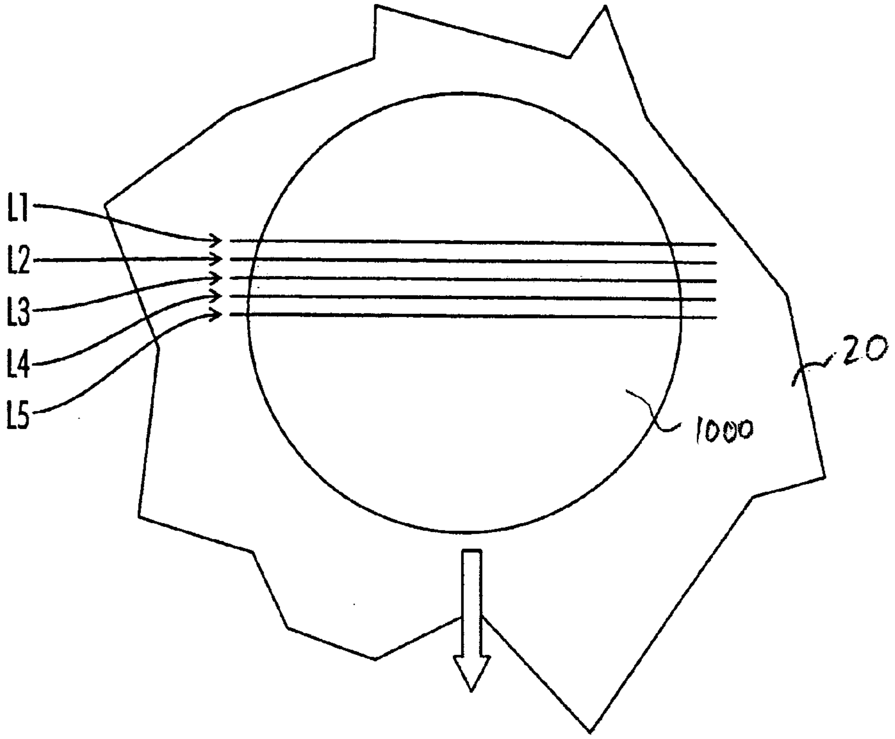
FIG. 7 is a partial top elevation view of a material 1000 passing through the detector system of the present invention, showing the lines of electromagnetic energy illumination.
Figure 8:
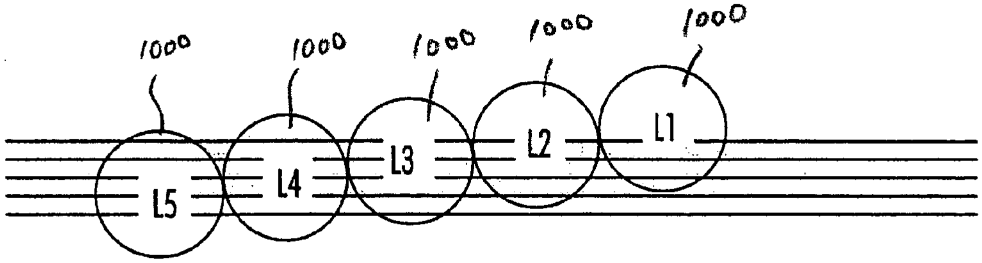
FIG. 8 is a schematic elevation view of a material 1000 passing through the detector system of the present invention, illustrating the sequential illumination of the material 1000.
Figure 9:
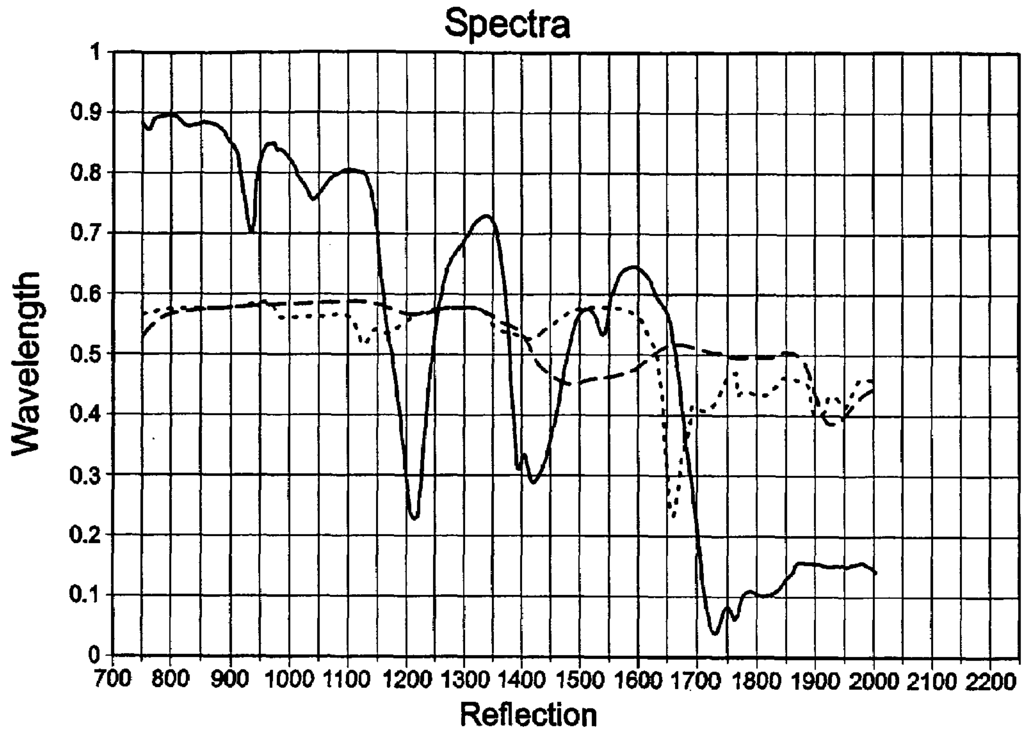
FIG. 9 is a graphical view of the reflection spectra of PET plastic (dotted line), HDPE (solid line) and paper (dashed line), respectively.
Figure 10:
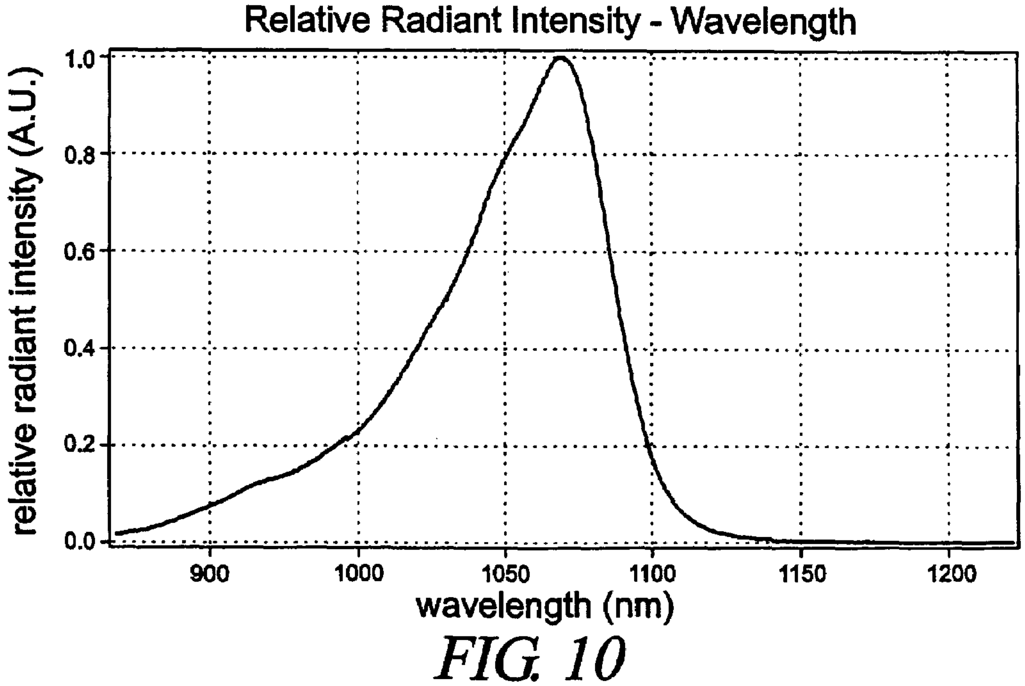
FIG. 10 is a graphical view of the typical bandwidth of LEDs.

FIGS. 7 and 8 show an alternate approach to achieving registration between the different frequencies of sources 110 with a relatively narrow beam width, by sequentially illuminating material 1000 in approximately the same place with each laser beam, designated L1-L5, respectively. The pulse rate and on time of the source 110 is coordinated to achieve this result.

Further, in order to reduce noise each pulse from a source 110 would be split into a plurality of short pulses to achieve the effect of a "chopper" system. For instance, source 110*a* would be actuated, for example, for 35 to 40 μsec, the reflected light measured, and then the detector signal measured with no illumination for 10 to 15 μsec. A "train" of such on-off pulses would require about 250 μsec to complete. During this time, if material 1000 were travelling at 1,000 feet per minute, it would have moved about 0.125 cm. Source 110*b* would then be pulsed in the same fashion as above but with the beam offset in the direction of motion by about 0.125 cm. The illumination from each subsequent source 110 would be offset by about 0.125 cm, so that each different frequency source 110 sequentially illuminates the same line across the material 1000. Sources 110 would be aligned vertically to minimize effects from variation in height of the object. The light collected by detector array 120 would be maximized, as the field of view is approximately 2.5 cm in diameter while material 1000 is illuminated during travel through the center 1.25 cm of the field of view. The beam width from each source 110 would be on the order of about 0.3 cm to 0.63 cm further "averaging" the measurements. If a slower speed for conveyor 20 is used, the on pulse would be lengthened such that the same line across material 1000 is still illuminated by each source 110. This approach does require that the measurements from each source 110 laser illumination are stored for each detector array 120 until a full set of 8 to 12 measurements are made. Once the full set of measurements is made for each array 120 the appropriate ratios can be calculated and identification made.

In operation, material 1000 is fed onto conveyor 20 using, e.g., the system disclosed by Grubbs, Kenny and Gaddis in U.S. Pat. No. 6,250,472. Entrainment airflow is also directed in the direction of the flow of travel of material 1000 defined by conveyor 20, along the direction indicated by the arrows in FIG. 1. As material 1000 continues along conveyor 20 as directed by the entrainment gas, material 1000 passes by detector system 100 which detects and/or measures the presence or absence of certain criteria, such as lignin content, whiteness, color, printed matter, etc. Material 1000 then flows across the openings of selection bins 44A and 44B as facilitated by the directional gas provided by directional gas sources 50A and 50B as well as fluidizing gas provided by source 60 and into default bin 42. However, when material 1000 meeting certain criteria, such as reflectivity, etc., passes by detector system 100, a signal is sent from detector system 100 to microprocessor 200 which then actuates one or more sorters 72 to direct individual one of material 1000 into one of the respective selection bins 44A and 44B. In this manner, sorting of material 1000 such as carrier board and paper can be accomplished at sufficiently high speeds and with sufficient accuracy and flexibility to be economical.

All cited patents and publication referred in this application are incorporated by reference.

The invention thus being described, it will be apparent that it may be varied in many ways. Such variations are not to be regarded as a departure from the spirit and scope of the present invention and all such modifications as would be apparent to one skilled in the art are intended to be included within the scope of the following claims.

What is claimed is:

1. A system for sorting lignin containing articles from non-lignin containing articles, comprising a detector system which comprises a plurality of narrow bandwidth sources of electromagnetic energy of differing frequencies sequentially illuminating articles passing through the detector system, said plurality including a first source of narrow band energy illuminating articles traveling through the detector system with energy having a wavelength less than the wavelength of a red fluorescence from lignin in the articles and having a narrow enough bandwidth so as not to substantially overlap the red fluorescence from the lignin in the articles, the detector system further comprising a collector for collecting electromagnetic energy reflected and fluoresced from the articles and measuring the red fluorescence from the articles, a deflector for deflecting selected articles toward an alternative destination; and a control system, operably connected to the collector and the deflector, for actuating the deflector in response to the presence or absence of lignin in the articles, wherein a ratio of red fluorescence to reflected green light is calculated for each article in order to factor out intensity variation caused by some articles being closer to the collector than others.

2. The system of claim 1, wherein the sources of electromagnetic energy comprise lasers.

3. The system of claim 1, which further comprises a conveyor for conveying articles through the detector system.

4. The system of claim 3, wherein the plurality of narrow bandwidth sources of electromagnetic energy sequentially illuminate articles passing through the detector system by illuminating non-overlapping portions of the conveyor extending across substantially an entire width of the conveyor.

5. The system of claim 1, wherein the plurality of narrow bandwidth sources of electromagnetic energy sequentially illuminate articles passing through the detector system by only one of the narrow bandwidth sources of electromagnetic energy being actuated at any one time.

6. The system of claim 1, which further comprises a lens through which received energy from the articles passing through the detector system is directed, a dichroic mirror reflecting light having a wavelength of at least about 600 nm, and two photodiodes disposed in relation to the dichroic mirror such that energy having a wavelength of at least about 600 nm is directed to one of the photodiodes and energy having a wavelength of less than about 600 nm is directed to the other photodiode.

7. The system of claim 1, wherein received energy from the articles passes to two photodiodes, one of which is covered by a bandpass filter with a center frequency of about 650 nm and a bandwidth of about 30 to 50 nm.

8. The system of claim 1, wherein each of the sources of electromagnetic energy is actuated in discrete pulses which are combined by detector array into a single signal.

9. The system of claim 1, wherein said first source has a wavelength encompassing 532 nm.

10. A method of sorting carrier board from newsprint in a stream of recycled waste articles, comprising:

(a) passing a stream of recycled waste articles through a detection system, said articles including newsprint which contains lignin, carrier board which does not contain substantial amounts of lignin, and plastic containers;

(b) sequentially illuminating the articles passing through the detector system with electromagnetic energy from a plurality of narrow bandwidth sources of electromagnetic energy of differing frequencies, the electromagnetic energy from at least a first one of said sources having a narrow enough bandwidth so as not to substantially overlap a red fluorescence from lignin;

(c) causing a red fluorescence from lignin in the articles including newsprint, said red fluorescence resulting from said lignin being illuminated by said first one of said sources;

(d) detecting the presence or absence of lignin in the articles based at least in part upon the presence or absence of red fluorescence from the articles;

(e) calculating a ratio of red fluorescence to reflected green light for each article in order to factor out intensity variation caused by some articles being closer to the detector system than others; and (f) deflecting selected articles toward an alternative destination, in response to the presence or absence of lignin in the articles, and thereby separating carrier board from newsprint.

11. The method of claim 10, wherein:

in step (b), the narrow bandwidth sources comprise lasers.

12. The method of claim 10, wherein:

in step (b), the narrow bandwidth sources comprise light emitting diodes.

13. The method of claim 12, wherein:

step (b) further comprises filtering electromagnetic energy from at least one of the light emitting diodes and thereby modifying the bandwidth of the electromagnetic energy from that light emitting diode.

14. The method of claim 10, wherein:

step (a) includes conveying the stream of recycled waste articles through the detector system on a conveyor.

15. The method of claim 14, wherein:

in step (b), the sequential illuminating of the articles comprises illuminating non-overlapping portions of the conveyor extending across substantially an entire width of the conveyor.

16. The method of claim 14, wherein:

in step (b), the sequential illuminating of the articles comprises only one of the narrow bandwidth sources being actuated at any one time.

17. The method of claim 10, wherein:

step (d) comprises passing reflected and fluoresced energy from the articles through a lens onto a dichroic mirror and reflecting energy having a wavelength of at least about 600 nm onto a first photodiode and directing energy having a wavelength of less than about 600 nm onto a second photodiode.

18. The method of claim 10, wherein:

step (d) comprises passing reflected and fluoresced energy from the articles to two photodiodes, one of which is covered by a bandpass filter with a center frequency of about 650 nm and a bandwidth of about 30 to 50 nm.

19. The method of claim 10, wherein:

step (b) comprises actuating each of the narrow bandwidth sources in discrete pulses; and step (d) comprises combining reflected and fluoresced energy resulting from the discrete pulses into a single signal.

20. The method of claim 10, wherein in step (b) said first one of said sources has a wavelength encompassing 532 nm.

* * * * *